(No Model.) 2 Sheets—Sheet 2.

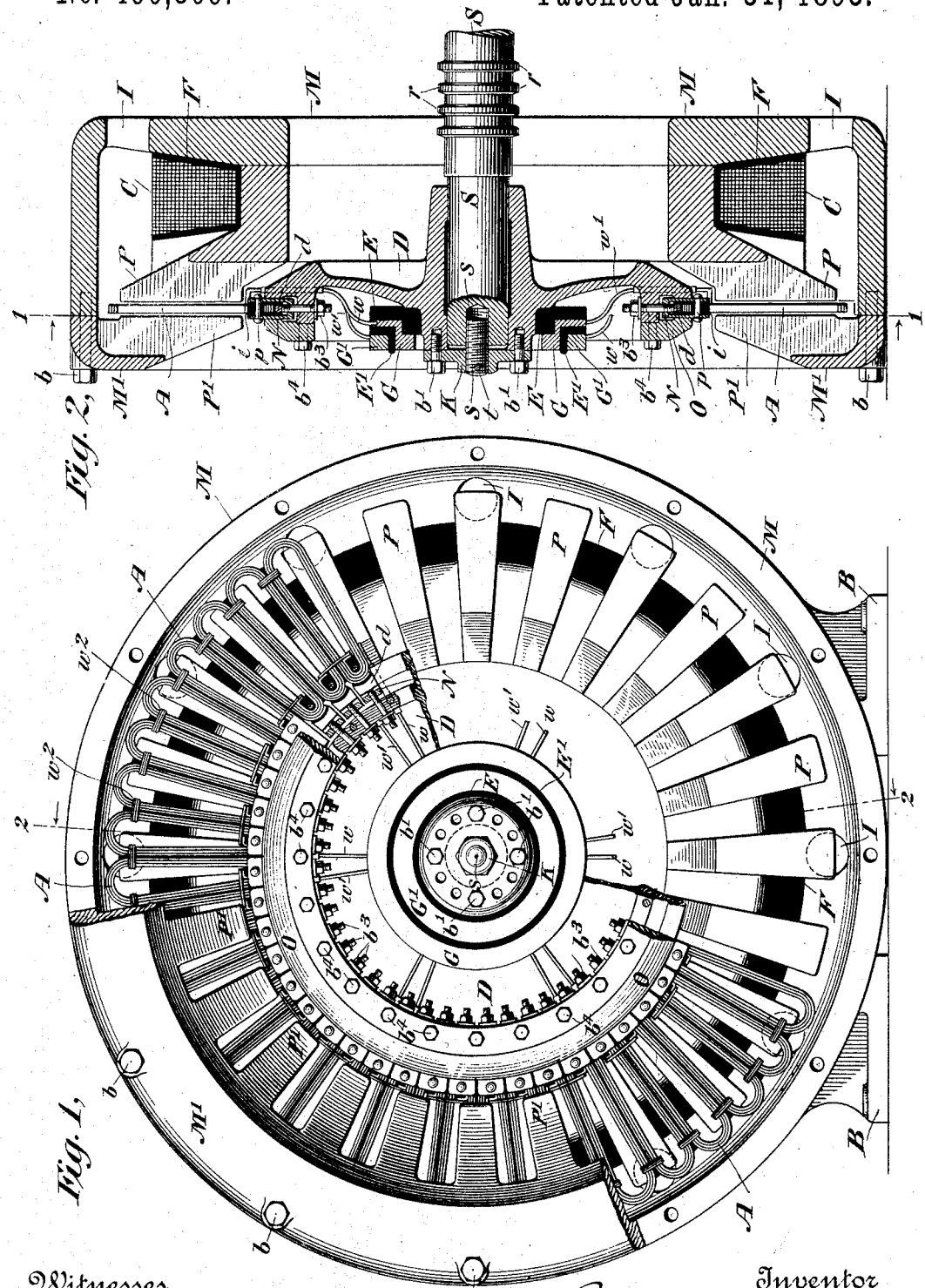

R. LUNDELL.
DYNAMO ELECTRIC MACHINE.

No. 490,809. Patented Jan. 31, 1893.

Witnesses
C. E. Ashley
G. M. Chamberlain.

Inventor
Robert Lundell
By his Attorney
Charles J. Kintner

UNITED STATES PATENT OFFICE.

ROBERT LUNDELL, OF BROOKLYN, ASSIGNOR OF TWO-THIRDS TO EDWARD H. JOHNSON, OF NEW YORK, N. Y.

DYNAMO-ELECTRIC MACHINE.

SPECIFICATION forming part of Letters Patent No. 490,809, dated January 31, 1893.

Application filed April 22, 1892. Serial No. 430,200. (No model.)

*To all whom it may concern:*

Be it known that I, ROBERT LUNDELL, a citizen of the United States, residing at Brooklyn, in the county of Kings and State of New York, have made a new and useful Improvement in Dynamo-Electric Machines, of which the following is a specification.

My invention relates especially to dynamo electric machines or electric motors of the disk armature type, and its objects are first to produce a machine of this type which can be cheaply constructed and quickly and easily taken apart for repairs. Second to adapt such a machine for use directly with the source of power as by direct connection to the engine shafting. Third to secure the several parts of the armature in such manner as to materially increase the efficiency of the machine and render it less liable to damage due to the centrifugal and other strains. Fourth to facilitate the adjustment of the armature as a whole relatively to the field poles of the machine. Fifth to simplify the field magnet construction and obtain thereby a structure of great mechanical strength with minimum magnetic leakage. Sixth to so dispose the iron in the machine as to afford large heat radiating capacity and thereby keep it cool; and I accomplish these several objects with the complete machine hereinafter described, the essentially novel features of which are particularly pointed out in the claims at the end of this specification.

In order that my invention may be fully understood reference is had to the following specification which is a full, clear and exact description of the entire machine, and also to the accompanying drawings in which like letters of reference represent like parts wherever used.

Figure 3:
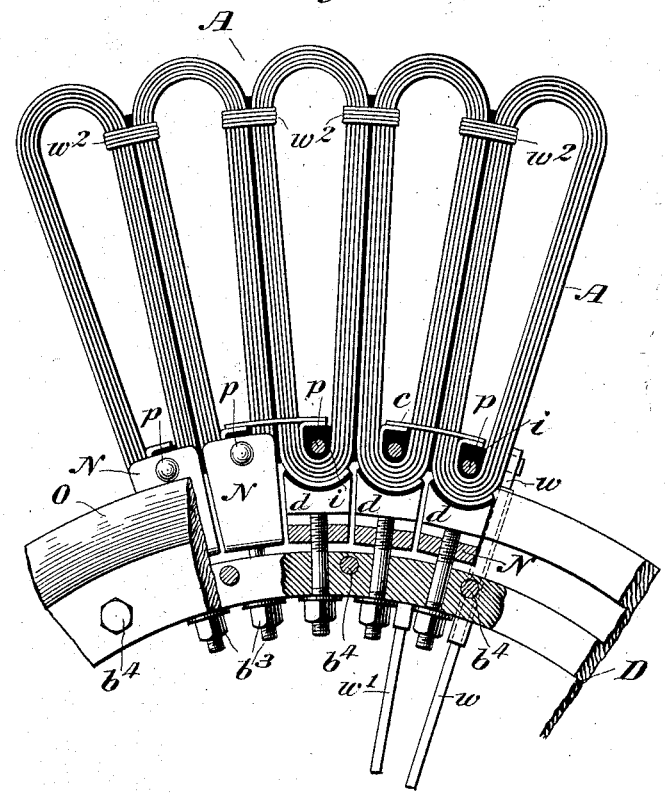
Figure 4:
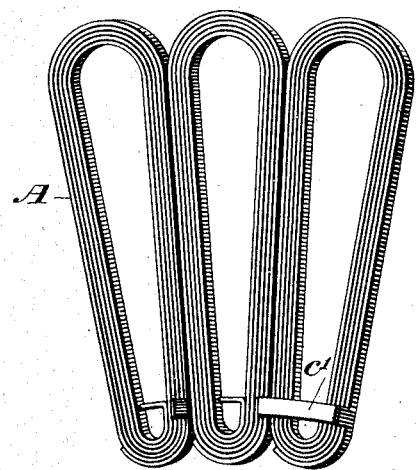

Figure 1 is a side elevational view of my novel machine, parts being broken away to fully illustrate the interior construction. Fig. 2 is a sectional view taken on line 2—2 Fig. 1 and as seen looking in the direction of the arrows on the right. Fig. 3 is an enlarged detail side elevational view of a part of the armature, parts being broken away and in section to fully disclose the manner of securing the individual bobbins or coils. Fig. 4 is a perspective view of three adjoining armature bobbins or coils showing also their interior and exterior or end connections.

Prior to my invention the armatures of machines of the disk armature type were made by what may be very properly termed "zig zag" winding. That is to say the armature coil was built up of one continuous flat strip of insulated conducting copper wound in zigzag lines round and round until the desired proportions were attained and the ends thereof were then connected to collecting rings carried by the armature shaft, the windings being held in place in various ways. Machines of this nature were made by Brush, Frick, Ferranti and others and although good results were attained with them the method of construction by continuous winding makes them necessarily expensive to repair and difficulty is found in adjusting and maintaining the disk in the open magnetic field and free from actual mechanical contact with the poles of the field magnets. Furthermore with machines so constructed the armature windings become badly distorted when rapidly rotated owing to the action of the centrifugal force and the drag or pull of the field magnets thereon. My improved machine is designed to overcome all such objections.

Referring now to the drawings in detail. M M' represent a two part field magnet core of disk shape held together by bolts $b\ b$ and sustained by a base B directly on the engine frame, not shown. The part M is separable, as shown in Fig. 1, C being a single field magnet coil lying on one side of the armature and in a plane substantially parallel therewith, the individual coils thereof being wound in a trough shaped ring F of vegetable fiber or analogous insulating material and held in place in a groove between the two parts of M. This coil is energized either by a separate exciter or may be self excited as will be fully understood by skilled electricians. The magnetic field in which the armature A revolves is made up of multiple radially disposed pole pieces P P &c. on one side and P' P' &c. on the other; one set being of north or plus, and the other of south or minus polarity. The armature shaft S which is preferably connected directly to the engine or other source of power is journaled in bearings not shown but adapted to surround the rings r r r and thereby prevent end thrust.

D is the armature supporting hub or collar which is secured by one or more keys in the faces of the shaft S, and O is a flat clamping ring or disk secured to the part D by bolts $b^4$ $b^4$ &c. The hub or collar D is adapted to slide endwise on the end of the armature shaft and is given such movement by a screw s secured by a pin t to a cap piece K which in turn is secured by four screws $b'$ $b'$ $b'$ $b'$ entering corresponding screw holes in the hub. The cap piece K is provided with twelve holes located at equal distances apart. The screw s has a pitch of eight threads per inch so that one complete revolution of the cap piece would advance or retreat it one eighth of an inch. It is apparent therefore, that one twelfth of a revolution would change the adjustment one ninety sixth of an inch. The armature supporting hub or collar D may therefore be advanced or retracted as desired and the screws $b'$ $b'$ $b'$ $b'$ secured in place, thereby effecting the most delicate lateral movement with relation to the opposing multipolar field poles P P and P' P' &c.

G and G' are the brush or contact rings insulated from each other and the hub D by vegetable fiber or analogous rings E E' and secured in the usual way. The current collecting brushes (not shown) would bear on the lateral or end faces of these rings, as will be obvious on inspection of Fig. 2. These rings are connected at intervals of say sixty degrees by insulated conductors $w$ $w'$ with the ends of the armature coils or bobbins A, there being shown forty-eight such coils joined in six series sets of eight in each series.

I will now describe the manner of building the armature. I take a narrow flat strip, preferably of insulated copper or other non-magnetic conducting material and of the desired length to constitute one bobbin or coil. This strip is wound firmly round and round upon itself and the ring thus made is placed in the open end of one of the thin metallic yoke pieces N (see Fig. 3) so that its outer face bears against the strip of insulating material $i$ on the inner face of a metal block $d$, screw-threaded on the inner end of a draw bolt $b^3$ which is also screw-threaded through the base of the yoke N. Additional insulating material $i$ is now placed under the free ends of the yoke N and on the inside of the coil and the rivet $p$ passed through it and the free end of the yoke N and the ends finally securely riveted. The draw bolt $b^3$ is now turned so as to make the coil assume the curvature of the block $d$ after which the coil is placed in a former which gives it substantially the shape it is to assume when all the coils are in their final position. After they are all thus built up they are assembled on the lateral face of the hub or collar D with the draw bolts $b^3$ $b^3$ projecting through radial bolt holes as shown, and with strips of insulating material between their adjoining edges. The ring or disk O is then laid in position on hub D the bolts $b^4$ $b^4$ tightened slightly so as to accurately maintain all of the yokes N and their sustained coils in one plane. The nuts on the inner ends of the draw bolts $b^3$ $b^3$ &c. are then tightened up as are also the nuts on bolts $b^4$ $b^4$ and in this manner the coils are caused to mass themselves into a frigid disk ring. The outer portions of the coils are now secured by single layer windings of strong thin insulated wire $w^2$ $w^2$.

An examination of Figs. 3 and 4 will reveal the manner of connecting the succeeding ends of the coils, the inner ends being connected on one side to conducting strips $c$ joining projecting lugs or ears and the outer ends similarly connected on the other side to strips $c'$, so that the coils are joined in series. They are then connected to the collector rings G and G' in series groups of eight by the insulated conductors $w$ $w'$.

It will be readily understood by those skilled in the art that the bobbins may be connected to the collector rings in any preferred manner or that the machine may be provided with commutators for rectifying the current in such manner as to make it a direct or continuous current machine.

By the disk or annular construction of the field core with multiple radial pole pieces I am enabled to utilize a single field coil and to obtain maximum efficiency with a minimum amount of magnetic leakage. With such a structure I also present a maximum heat radiating surface thereby preventing undue heating of the iron. The ventilating holes I around the core permit the armature bobbins to draw air through the machine over and around the coil, the armature and the field poles thereby keeping the entire machine cool and avoiding great waste of energy.

Having thus described my invention, what I claim and desire to secure by Letters Patent of the United States is:—

1. A dynamo electric machine having a disk armature and a single field magnet coil lying in a plane on one side of said armature and parallel thereto, in combination with radially disposed multipolar pole pieces between which the armature rotates, substantially as described.

2. A dynamo electric machine having a disk armature and a single field magnet core provided with radially disposed multipolar pole pieces magnetized by a single field magnet coil lying in a plane on one side of said armature and parallel thereto, substantially as described.

3. A dynamo electric machine having a single field magnet coil, a single field magnet core with radially disposed pole pieces and a disk armature, the field magnet coil being located on one side of the armature with its windings located in planes substantially at right angles to the armature shaft substantially as described.

4. A dynamo electric machine having a single cylindrical field magnet core with a single energizing field magnet coil and a disk armature located between oppositely disposed multipolar pole pieces, the field magnet coil being located on one side of the armature substantially as described.

5. A cylindrical or disk shaped field magnet core surrounding or inclosing a single energizing field magnet coil and provided with radially disposed multipolar field magnet poles embracing an armature which rotates in a plane parallel with the inner end of the energizing coil substantially as described.

6. A hollow cylindrical or disk shaped field magnet core inclosing an energizing field magnet coil and provided with multipolar field magnet poles of opposite polarity and a rotary armature located between said poles the armature and the field magnet coil being situated in independent parallel planes substantially as described.

7. A hollow ring shaped field magnet core inclosing an energizing field magnet coil said field magnet core being provided with multipolar pole pieces of opposite polarity both sets of pole pieces being located on the same side of the field magnet coil substantially as shown and described.

8. A hollow ring shaped field magnet core inclosing its energizing field magnet coil and provided with multipolar pole pieces and ventilating holes, all of the pole pieces being located on one side of the field magnet coil substantially as described and shown.

9. A hollow ring shaped field magnet core made in three annular pieces inclosing or surrounding a single energizing field magnet coil and having multipolar pole pieces arranged in two integral sets both located on the same side of the field magnet coil substantially as shown.

10. A hollow ring shaped field magnet core having two integral sets of multipolar pole pieces, energized by a single inclosed coil both sets of pole pieces being located on the same side of the coil substantially as shown.

11. A disk armature made up of a series of flat bobbins each provided with an independent adjustable clamping device and all secured to a hub or collar, substantially as described.

12. A disk armature made up of a series of bobbins which bear laterally against each other and each provided with adjustable means secured to a carrying collar or hub whereby they may be securely held against centrifugal action, substantially as described.

13. A disk armature made up of individual sectional bobbins provided with clamps and means for securing them all to a common collar or hub, as described.

14. A disk armature made up of a series of flat elongated bobbins connected at their inner ends by independent adjustable yokes and bolts to a hub or collar, in combination with a flat ring or disk which bears on said yokes and is bolted to the hub or collar, substantially as described.

15. An armature carried by a shaft provided with means for preventing end thrust, in combination with means for adjusting the armature in either direction on the shaft, and additional means for adjusting the armature on the shaft in the direction of its rotation substantially as described.

16. A disk armature carried by a shaft having means for preventing end thrust, in combination with means for moving the armature in either direction on the shaft, and additional means for adjusting the armature on the shaft in the direction of its rotation substantially as described.

17. A disk armature secured to a hub having longitudinal movement on a rotary shaft, in combination with means for moving the hub in either direction on the shaft, and additional means for adjusting the armature on the shaft in the direction of its rotation substantially as described.

18. An armature carried by a hub keyed to and having sliding motion on a rotary shaft, in combination with screw threaded adjusting connections for accurately adjusting the position of the armature, in the direction of the length of the armature shaft and additional means for adjusting the position of the armature on the shaft in the direction of its rotation substantially as described.

19. A ring shaped field magnet core having multipolar field poles radially disposed and a flat or disk armature adapted to rotate between said poles and connected to a rotary shaft by adjusting devices whereby it may be maintained in the magnetic field out of mechanical contact with the field poles, substantially as described.

20. A disk armature made up of sections or bobbins having side lugs connected together in series by conducting strips in combination with clamps and means for securing said parts all to a common collar or hub substantially as described and shown.

21. A dynamo electric machine having its field magnet core made of a hollow ring or disk shape inclosing the field magnet coil and provided with ventilating holes for admitting air to the interior of the machine, substantially as described.

22. A dynamo electric machine having its field magnet core made of ring or disk like shape with radially disposed multipolar pole pieces between which the armature rotates in combination with a single magnetizing coil inclosed within the core and ventilating holes for admitting air to the interior of the machine, substantially as described.

ROBERT LUNDELL.

Witnesses:
C. J. KINTNER,
G. M. CHAMBERLAIN.